June 14, 1955     E. H. HILBORN ET AL     2,710,820
FORMATION OF LAMINATES USING CONTACT RESINS
Filed Sept. 18, 1952     2 Sheets-Sheet 1
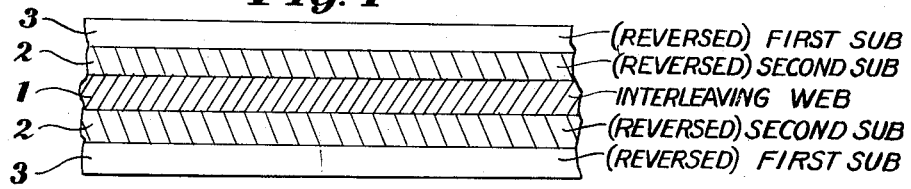
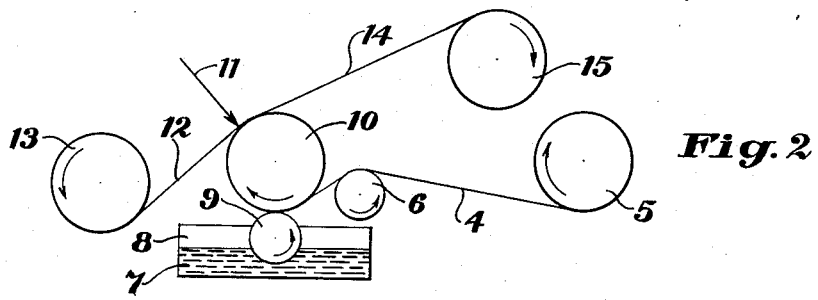
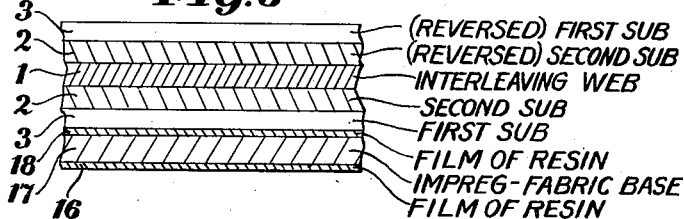
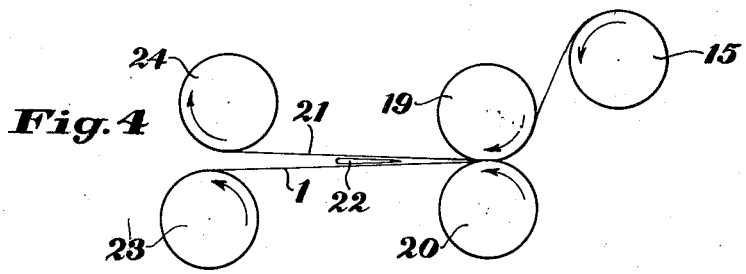
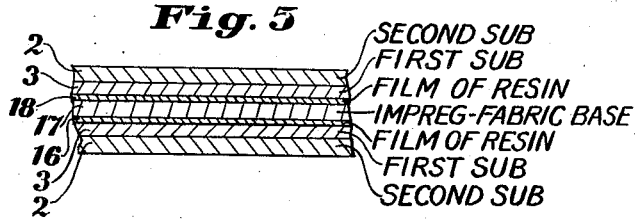
*Edwin H. Hilborn*
*Carl F. Smith*
    INVENTORS
BY
ATTORNEYS

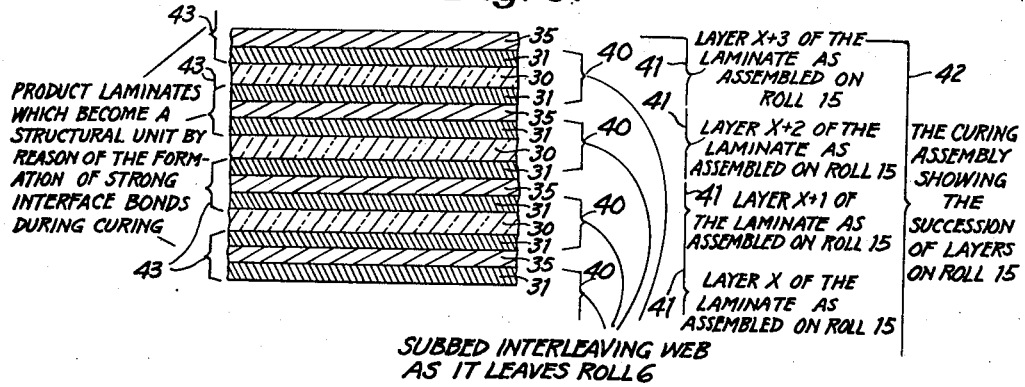
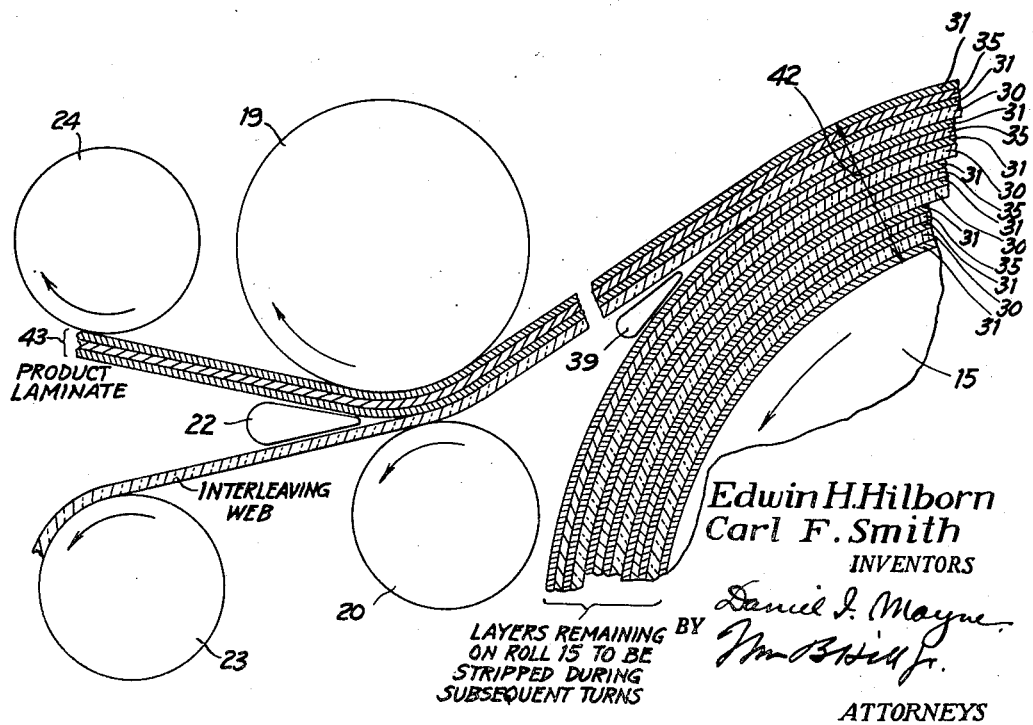

United States Patent Office 2,710,820
Patented June 14, 1955

2,710,820

FORMATION OF LAMINATES USING CONTACT RESINS

Edwin H. Hilborn and Carl F. Smith, Rochester, N. Y., assignors to Eastman Kodak Company, Rochester, N. Y., a corporation of New Jersey Application September 18, 1952, Serial No. 310,284

6 Claims. (Cl. 154—95)

The present invention relates to the formation of laminated fabrics in which a thermosetting contact resin is employed to impregnate and coat a fabric base material. More particularly the invention is concerned with the preparation of tracing cloths.

Currently available tracing cloth quite generally is made by the sizing of a good grade of woven fabric followed by the application of one or more additional layers as needed to provide the requisite qualities. Where a photosensitive material is to be produced, a sized and water-proofed fabric ordinarily is provided with one or more subbing layers prior to application of the photographic emulsion. The recent introduction of the so-called contact resins has provided a material which is aptly suited to sizing and water-proofing cloth which is to serve as a base for photographic tracing cloth.

The term "contact resins" is employed in the present specification to mean those resins which are thermosetting in the absence of air without substantial production of by-products such as water and the like and which may be applied as coatings in an uncured liquid state without the use of solvents which must be removed by volatilization. Ordinarily these resins are employed as liquids comprising unsaturated high molecular weight monomers or mixtures of unsaturated polyester or alkyd in a solution of styrene or other vinyl monomer or a combination of these types. The term "contact resin solution" as used in the present specification and claims is intended to include liquid coating and impregnating compositions of contact resins with or without components in the nature of true solvents. The liquids are subject to curing by catalytic polymerization by heat, generally under a very low pressure.

These resins are available under various trade names such as Paraplex P series resins (The Resinous Products & Chemical Company), Vibrin (Naugatuck Chemicals Corporation) and others, and in their fluid form are thick, sirupy liquids or solutions.

Current procedure for forming a contact resin impregnated fabric base calls for coating and impregnation of the fabric with the resin solution, superimposition of a web of interleaving material such as cellophane onto the fabric, winding up of the fabric with the interleaving material into a roll to provide a confining and air-free atmosphere for polymerization, and treatment of the rolled, impregnated and interleaved fabric to provide for curing of the resin. When polymerization has been completed the laminate is unwound and the interleaving material removed from the impregnated fabric.

While the foregoing procedure often gives satisfactory results it is not suitable in many instances where subbing layers are to be imposed upon the fabric base. For many purposes, inclusive of tracing cloth manufacture, the impregnation and coating of the fabric is carried out in a manner whereby the product comprises a fabric having its interstices substantially completely filled with resin and having in addition a thin surface film or coating of the resin. Adequate adhesion between the thus prepared fabric base (actually the resin film) and the next adjacent sub usually is not obtainable where the sub is coated onto the cured impregnated fabric base, and this obviously has created a serious problem of major proportions.

We have found that a strong tenacious bond can be formed between the sized, i. e., coated and impregnated fabric and the subbing layers by the employment of a novel manipulative procedure. We also have discovered that proper coating and impregnation of the fabric base can be obtained nicely by means of a new procedure which is adapted for continuous laminating and coating procedures.

In accordance with our invention, the interleaving material necessary to proper setting up of the resin on the impregnated base is made to serve as a temporary support for the subbing layers and a temporary laminate formed thereby is further coated with resin solution and interleaved with the fabric base while the resin is in its unpolymerized and wet form. By means of a reverse coating technique the interleaving material is made to serve a dual purpose in that it functions both as a support for the temporary laminate and for interleaving. In a most advantageous procedure, the interleaving material serves an additional function as a resin solution applicator.

Briefly stated, the preferred procedure of the invention comprises the steps of forming a temporary laminate by coating onto a strippable interleaving material, in reverse order, the sub layers which are to be between the sensitive emulsion and the fabric base, applying a coating of the resin solution to the coated interleaving material, superimposing the fabric base upon the resin-coated side of the interleaving material and forming thereby a temporary curing assembly, subjecting the temporary assembly to polymerization conditions whereby to set and cure the resin, and removing the interleaving material from the curing assembly, leaving a permanent laminate having a resin impregnated fabric base. The procedure is applicable to sheets and webs and the general and generic expressions such as "interleaving material" used herein are intended to designate all shapes and sizes of films, webs, sheets and the like. It will be appreciated that the various laminae and coatings should be of the same size and shape in any given assembly. In its most advantageous embodiment, the invention concerns operation with long "continuous" running lengths of sheet material, normally termed webs, and in this embodiment the temporary curing assembly most advantageously may be prepared in the form of rolls of wound up superimposed webs.

The invention is illustrated in the accompanying drawings in which

Fig. 1 is a diagrammatic representation of a section through a portion of an interleaving sheet or web sub-coated in reverse, Fig. 2 is a diagrammatic representation of a method of applying a resin solution to an interleaving web sub-coated as illustrated in Fig. 1 and laminating the resin coated web with a permanent fabric web base, Fig. 3 is a diagrammatic representation of a section through a part of a curing assembly formed as illustrated in Fig. 2, Fig. 4 is a diagrammatic representation of a method of forming a permanent fabric base laminate by stripping and removal of an interleaving web from a rolled curing assembly formed as illustrated in Figs. 2 and 3, and Fig. 5 is a diagrammatic representation of a vertical section through a permanent laminate formed in accordance with the invention and having a cured resin coated and impregnated fabric base, Fig. 6 is a simplified diagrammatic representation of the succession of layers in the curing assembly formed on roll 15, showing also the changes in the relationship of the layers during curing, and Fig. 7 is a simplified diagrammatic representation in exaggerated detail showing changes in relationship of the layers during the stripping operation of Fig. 4 but where, for clarity, only a single subbing layer is employed on each side of the support.

With reference to Fig. 1, it will be observed that an interleaving material e. g., sheet or web 1, has been coated in reverse (in this case on both sides) first with a second subbing layer 2 of e. g., gelatin and nitrocellulose and subsequently with a first subbing layer 3 of e. g., cellulose acetate butyrate and nitrocellulose.

In Fig. 2, a sub-coated interleaving web 4 of the type illustrated in Fig. 1 is shown being unwound from a roll 5, run over an idle roll 6 and coated on one side with a resin solution 7, from a tank 8 by means of a coating roll 9 and a backing roll 10. At the point indicated by the arrow 11, a web of fabric base 12 being fed from roll 13 is superimposed upon the resin-wet side, i. e. a resin-wet first sub 3 of the coated interleaving material and brought into intimate contact therewith under light pressure to provide a curing assembly 14 which is wound up and formed into a roll 15. The curing assembly, with the resin solution still wet may be sent to a curing oven or otherwise treated to cause polymerization of the resin.

In Fig. 3 the curing assembly 14 is shown to comprise, in order from the bottom, a film 16 of resin impregnant on the outside of the impregnated fabric 17, a film 18 of resin impregnant on the inner side of the fabric, the first sub-coating 3, the second sub-coating 2, the interleaving web 1 and the subs 2 and 3 in reverse order on the upper side of the interleaving material. Subsequent to complete curing of the resin, the material from the roll 15 may be unwound and the interleaving web removed.

Fig. 4 is illustrative of a stripping method for removal of the interleaving web and shows the curing assembly roll 15 being unwound and the cured web fed through guide rolls 19 and 20. Subsequent to passage of the web through the guide rolls, the interleaving web 1 is parted from a thus formed fabric base permanent laminate 21, a stripping member 22 insuring parting of the resulting webs which are shown being wound onto rolls 23 and 24.

The product material, i. e. the permanent laminate 21 which is illustrated in Fig. 5 is now ready to have a sensitive emulsion applied. It will be observed that the permanent laminate consists of the resin impregnated fabric base 17 carrying the resin films 16 and 18 and subbing layers 3 and 2.

Fig. 6 shows more clearly the relationships assumed by the layers of the laminate prepared on the roll 10 and by the layers of the curing assembly in place on the roll 15. In Figs. 6 and 7 the representation has been simplified by exclusion of the second subbing layer and of the resin film on the surfaces of the glass fabric supporting web. Referring now to Fig. 6, it will be noted that each of the smallest brackets 40 to the right of the laminate section shows a laminate consisting of an interleaving web 30 temporarily supporting a subbing 31 with which it has been coated on both sides. Thus the brackets 40 indicate both the nature of the laminate leaving the roll 5 in Fig. 2 and the final position of the successive layers of the laminate in the curing assembly on roll 15. It will be noted that the curing assembly on roll 15 consists of a series of these superimposed three-membered laminates 40 with a layer of resin-impregnated glass fabric 35 sandwiched between each of the laminates.

The glass fabric 35 is applied to the upper side of the laminate 40 at the point 11 on wheel 10 (Fig. 2) after the laminate 40 has received resin from the coating roll 9 (Fig. 2), and the laminate formed by application (Fig. 6) of the glass web 31 to the resin wet laminate 40 is indicated by the brackets 41, each representing a simplified section through the assembly traveling from the roll 10 to the roll 15 in Fig. 2. As shown in Fig. 6 and assuming that the roll 15 is below the layers shown in section, the laminates 41 are numbered to show how the succession of layers serves to build up the whole curing assembly indicated by the bracket 42. Represented by brackets 43 are the product layers which will result after curing and removal of the interleaving web 30.

In the condition in which the various layers are first positioned on the roll 15 there is relatively little bond between the glass fabric 35 and the subbing layers 31 adjacent to it as compared with a relatively strong bond between the interleaving web 30 and the subbing layers 31. During curing of the curing assembly, a remarkably tenacious bond is created between the glass fabric 35 and the subbing layers 31 adjacent to it, this newly created bond being relatively much stronger than the bond existing between the interleaving web 30 and the subbing layers 31. Whereas in the sandwiching operation above referred to the laminate in the layers successively designated $x$, $x+1$, $x+2$ and $x+3$ has existed as a structural unit, curing of the assembly results in a reversal in the relative strength of the bonds between the interleaving web and the subbing on one hand and between the glass fabric and the subbing on the other hand. Because of this reversal, the structural units which survive during stripping are those indicated by the brackets 43 on the left of Fig. 6 as product laminates. The strength of the bonds between the layers of these laminates causes the layers to remain as a unit although the interleaving web is removed and the original unit of which it was a part is destroyed.

In the exaggerated detail of Fig. 7 it will be observed that the layers are shown on the roll 15 with an upper unit of four layers being removed from the roll during the stripping. Of the four layers, the bottom-most is the interleaving web. This is so because in bond reversal as explained above, the subbing layer 31 beneath the interleaving web 30 has formed a stronger bond to the glass fabric 35 beneath it than to the interleaving web 30 above it, and the subbing layer remains on the roll 15 as a unit with the glass fabric beneath it.

Thus a first stripping action occurs as the upper layers leave the roll 15 in that the subbing layer formerly associated with the bottom of the interleaving web (before curing) is parted from the interleaving web at this point and remains on the roll as a part of a structurally unitary product laminate (43 in Fig. 6). A stripping member or knife 39 is shown adjacent to the roll 15 for the purpose of better illustrating the point at which the first stripping operation occurs. In actual practice such a member normally is not necessary. A second stripping operation occurs at a point adjacent the nip of the rolls 19 and 20 when the product laminate (43 in Fig. 6) unit above the interleaving web 30 is removed from the latter by reason of the stronger bond of the subbing layer 31 with the glass fabric 35 relative to the weaker bond of the subbing layer 31 with the interleaving web.

It will be appreciated that the concept of the invention whereby a tenacious bond is formed between a contact resin-impregnated fabric and coatings thereon is not limited to preparation of tracing cloth. It further will be appreciated that the method whereby an interleaving material is made to provide a dual function as part of a temporary laminate or triple function including also that of applicator for the liquid resin is quite useful in the preparation of tracing cloth either of the photographic or non-photographic variety where additional layers are required. In fact the invention will be found of utility in many instances in which a fabric base material or layer, particularly of a woven glass fiber fabric which is to be impregnated with a thermosetting contact type resin solution is subsequently to be bonded to an additional layer with which bonding normally is difficult of achievement once the resin has been polymerized, The following examples are illustrative of various assemblies prepared in accordance with the invention to provide laminates suitable as supporting material for light-sensitive emulsions and primarily intended for use as tracing material.

Example 1

An interleaving web of cellulose triacetate was subbed on both sides with the following composition which included ground glass to provide a matte surface:

| | |
|---|---|
| Gelatin | 1.5%. |
| Acetic acid | (65% of the weight of the gelatin). |
| Nitrocellulose | 0.1%. |
| Water | 20.0%. |
| Chrome chloride | (1.5% of the weight of the gelatin). |
| Ground glass | 1.0%. |
| Methyl alcohol | Balance to make 100%. |

This first-applied sub was equivalent to the (reversed) second sub 2 in the drawings. Over the sub as above prepared was applied (to both sides of the web) a second subbing layer having the following composition:

| | |
|---|---|
| Cellulose acetate butyrate | 0.5%. |
| Nitrocellulose | 0.75%. |
| Ethylene chloride | 25.0%. |
| Methyl alcohol | Balance to make 100%. |

This second-applied sub was equivalent to the (reversed) first sub 2 in the drawings, and the subs hereinafter will be identified in the terminology of the drawings, which terminology is of course based upon the positions of the subs in the final product. The temporary laminate formed by the temporary base and the subs was then coated with a solution of a thermosetting unsaturated alkyd resin in monomeric styrene, the resin solution having a composition as follows:

| | Percent |
|---|---|
| Rigid type thermosetting polyester resin | 22 |
| Flexible type thermosetting polyester resin | 22 |
| Styrene monomer | 56 | and being modified by the addition thereto, based on the weight of the solution, of:

| | Percent |
|---|---|
| Peroxide catalyst in a solution of plasticizer | ¼ to ½ |
| Cobalt naphthenate | ¼ to ½ |

The temporary laminate was coated with the modified resin solution and wound up into a roll with an untreated web of woven glass fiber fabric in the manner as indicated in Fig. 2.

The roll of glass cloth interleaved with the subbed triacetate film was placed in a curing oven and maintained at about 250° F. for two hours. During this period the roll was rotated slowly to prevent irregularities in the distribution of the resin. Upon completion of the cure, the roll was removed from the oven, unwound, and the interleaving material removed from the glass cloth, leaving the subbing layers firmly bound to the resin impregnated permanent glass cloth base. The resulting cloth support was then coated with a photographic emulsion by conventional methods.

Example 2

In this example, three subbing layers were employed, being applied in reverse order to the interleaving web in the following succession: (1) third sub, (2) second sub, and (3) first sub. A cellulose triacetate interleaving material was first subbed on both sides with a (reversed) third subbing layer solution comprising:

| | |
|---|---|
| Gelatin | 2.0%. |
| Acetic acid | 0.5%. |
| Arctic Syntex T, paste [1] | 0.1%. |
| Water | 20.0%. |
| Methanol | Balance to make 100%. |

[1] A commercial solution of the sodium taurine salt of oleic acid.

This application was followed by application on both sides of the subbed interleaving material of a coating of a (reversed) second subbing material comprising:

| | Percent |
|---|---|
| Cellulose nitrate | 2.0 |
| Methanol | 98.0 |

A (reversed) first sub was then formed on each side of the coated interleaving material by an application of:

| | |
|---|---|
| Cellulose acetate butyrate | 4.0%. |
| Dibutyl sebecate | 15% of the weight of the butyrate. |
| Butyl stearate | 10% of the weight of the butyrate. |
| Acetone | 50.0%. |
| Ethylene dichloride | Balance to make 100%. |

Finally, the interleaving material carrying the three subs on each side was coated on one side, i. e. on one of its (reversed) first sub layers with a contact resin solution comprising a thermosetting unsaturated polyester resin containing a polymerization catalyst and an unsized nylon fabric was laid onto the resin-wet side of the coated interleaving material and the whole assembly was wound up into a roll. The resin was polymerized in situ. When the roll was unwound, it was found that the third (gelatin) sub layer adhered poorly to the interleaving material although there was a strong tenacious bond of a permanent nature between the nylon fabric and the first (butyrate) sub layer, or rather between the first sub layer and the polyester resin cloth impregnant and coating. The interleaving triacetate film was therefore removed from the assembly without difficulty during a rewinding operation as illustrated in Fig. 4, leaving the resin impregnated cloth subbed and ready for the emulsion coating operation.

A variety of materials might be used for this subbing technique, provided that the following requirements are met:

1. The first applied, i. e. the (reversed) third sub should be capable of later being dry stripped from the interleaving sheet, and should contain a material compatible with a photographic emulsion (in general, this means that if a gelatin emulsion is to be coated onto the product, this third sub should contain gelatin).

2. The second applied, i. e. the (reversed) second sub should have some degree of mutual compatibility between the first and third sub layers.

3. The third applied, i. e. the (reversed) first sub layer should contain a material which is soluble in and/or compatible with the monomer present in the particular polyester used. In the case of Paraplex resin, solubility in styrene monomer is required. Suitable materials include Gelva V-25 (a vinyl acetate resin), normal butyl methacrylate, isobutyl methcrylate, high butyryl cellulose acetate butyrate, Santolite M. H. (a toluene suphonamide resin), or ethyl cellulose. These may be used alone, or in combination with each other, or with other materials not soluble in monomeric styrene. Examples of these types are listed below:

1.

4% low viscosity ethyl cellulose
50% acetone
Balance ethylene dichloride

2.

3% normal butyl methacrylate
3% isobutyl methacrylate
20% acetone
Balance ethylene dichloride

3.

2% nitrocellulose, subbing grade
2% vinyl acetate resin solution
10% methanol
Balance acetone While in preparation of a photosensitive tracing cloth a three sub technique is to be preferred because of improved latitude, two sub techniques providing excellent products include techniques such as use of a gel-nitrate sub, followed by a nitrate-acetate butyrate sub. It is to be noted that the invention also is applicable to procedures for the manufacture of permanent laminates consisting of a single layer bonded to a contact resin-impregnated and coated fabric base where the layer is of such a nature that inadequate bonding would result from coating of the layer onto an impregnated fabric base which had been cured. It will be observed that even for the single layer type of assembly the interleaving material may serve the three functions of (a) interleaving, (b) providing a temporary base for the layer, and (c) applying the proper amount of resin to the fabric. In the application of the invention to the preparation of a photosensitive tracing cloth or other laminate comprising a plurality of layers on an impregnated fabric base, the employment of an interleaving web for the additional purposes to achieve a permanent bond in accordance with the inventive concept may or may not require the use of the novel reverse subbing procedure as taught above.

*Example 3*

A photographic tracing cloth having a permanent base of woven glass fiber impregnated with a thermosetting contact copolymer of styrene with a maleic acid-polyglycol polyester was prepared by means of the procedure described above with a two sub technique with subbing compositions as follows applied to a regenerated cellulose interleaving web in the order shown, a small amount of white pigment being added to the composition II to decrease the degree of transparency of the product:

I.

1.5% low ash content photographic gelatin
25% weight of gelatin of acetic acid
0.25% cellulose nitrate
1.5% weight of gelatin of chrome chloride
20% water
Balance methanol

II.

0.5% low viscosity high butyryl cellulose acetate butyrate
0.75% cellulose nitrate
50% ethylene dichloride
Balance methanol The resin was applied by roller application to the reverse subbed interleaving web by means of roller application under a four foot diameter drum. The glass cloth was laid down on top of the wet resin coating and the resulting assembly was carried around the drum and wound up without contacting any idle rolls. Curing and removal of the interleaving web were accomplished in the manner described above.

In accordance with ordinary subbing procedures it generally will be convenient to apply the subs to both sides of the interleaving web rather than to one side only. Obviously the invention may be carried out by coating only one side of the interleaving web since the interleaving material normally will be strippable from the next adjacent resinous surface.

We claim:

1. A procedure for obtaining a tenacious bond between a fabric base impregnated and coated with a contact resin solution and an additional layer adapted to be associated with the impregnated fabric base, said procedure comprising the steps of applying the additional layer as a coating on a temporary support comprising a strippable interleaving sheet, applying the contact resin solution as a coating onto the coated additional layer, superimposing the fabric base upon the resin solution-wet side of the thus coated interleaving sheet and forming thereby a curing assembly, subjecting the thus formed assembly to polymerizing conditions and thereby setting the resin, and subsequently stripping the temporary support from the cured assembly forming thereby a permanent laminate comprising fabric base and the additional layer permanently bonded thereto.

2. In a method of preparing a subbed photosensitive tracing cloth comprising a woven fabric base coated and impregnated with a solution of a contact resin and carrying a plurality of subbing layers the improved method of obtaining a permanent bond between the coated and impregnated woven fabric base and the subbing layers, said improved method comprising the steps of coating the subbing layers in reverse order onto at least one side of a strippable interleaving web, applying a coating of the contact resin solution to said one side of the reverse coated interleaving web, superimposing the woven fabric base on said one side of the coated interleaving web, forming thereby a curing assembly, polymerizing and setting the resin to form a cured curing assembly providing a permanent tenacious bond between the impregnated and coated woven fabric base and the subbing layers, and removing the interleaving web from the cured curing assembly.

3. In the preparation of photosensitive tracing cloth an improved method for the preparation of a support for a sensitive emulsion, said method comprising the steps of reverse subbing of a strippable interleaving web, coating of the subbed web with a contact resin solution, lamination of the thus subbed and coated interleaving web with a permanent base comprising a woven fabric to provide thereby a curing assembly, curing of the assembly by heating to cause polymerization of the resin, and stripping of the interleaving web from the thus cured assembly.

4. A method for preparing a subbed photosensitive tracing cloth comprising a woven glass fabric base coated and impregnated with a solution of a contact resin and carrying a plurality of subbing layers, said method comprising coating a second subbing layer of gelatin and nitrocellulose onto a strippable cellulose triacetate interleaving web, coating a first subbing layer of cellulose nitrate and cellulose acetate butyrate onto the thus coated interleaving web, said subbing layers each being coated onto both sides of said web, applying a further coating to one side of the thus coated web of a contact resin solution comprising a thermosetting composition of a polyester in solution in styrene, superimposing a woven glass fabric web onto the resin-wet side of the coated interleaving web under light pressure and forming thereby a curing assembly, heating and thereby curing the resin in said curing assembly forming thereby a permanent tenacious bond between said woven glass fabric and said first subbing layer, removing the interleaving web from the curing assembly, producing thereby a permanent supporting laminate, and coating said permanent supporting laminate at the outer surface of said second subbing layer with a photosensitive emulsion.

5. A procedure as defined in claim 1 wherein the fabric base is a woven glass fiber base.

6. A method as defined in claim 2 wherein the woven fabric base is a woven glass fiber base.

References Cited in the file of this patent

UNITED STATES PATENTS

| | | |
|---|---|---|
| 2,548,872 | Cross et al. | Apr. 17, 1951 |
| 2,567,186 | Cross et al. | Sept. 11, 1951 |
| 2,592,602 | Saks | Apr. 15, 1952 |
| 2,596,754 | Yackel | May 13, 1952 |
| 2,596,756 | Yutzy et al. | May 13, 1952 |
| 2,612,446 | Umberger | Sept. 30, 1952 |